Patented Nov. 2, 1926.

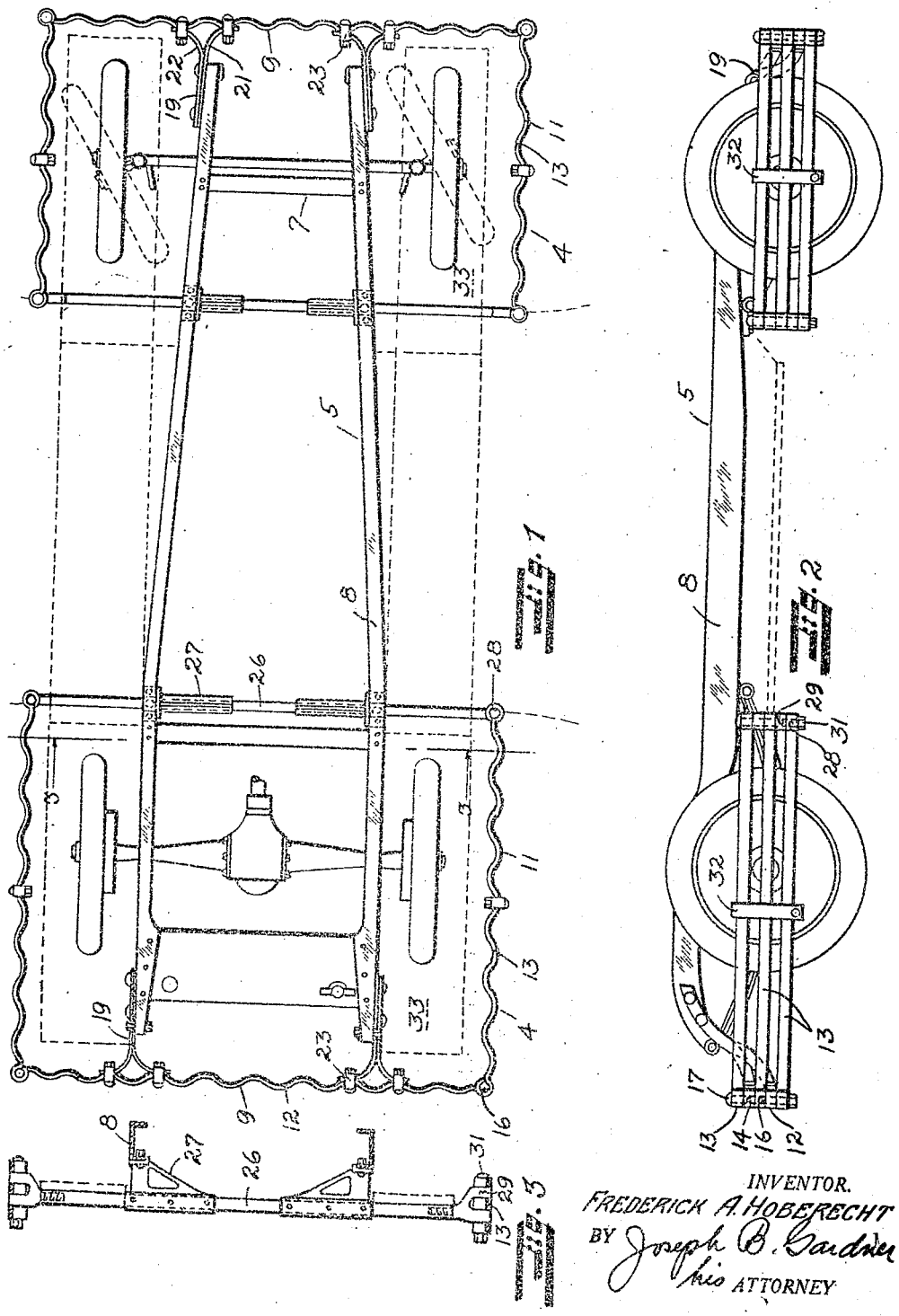

1,605,584

UNITED STATES PATENT OFFICE.

FREDERICK A. HOBERECHT, OF OAKLAND, CALIFORNIA.

COMBINED BUMPER AND GUARD FOR AUTOMOBILES.

Application filed October 10, 1925. Serial No. 61,716.

My invention relates to a combined bumper and guard arranged to serve as a means of protecting an automobile in case of collision.

An object of the invention is to provide a device of the character described which will provide not only a means for protecting an automobile in head-on collisions but will prevent the damaging of any of the wheels of the automobile, such as occurs by "sideswiping" and collisions wherein one car rams the side of another.

Another object of the invention is to provide a device of the character described which will combine neatness of appearance with sturdiness of construction and utility of purpose.

A further object of the invention is to provide a device of the character described which will not interfere with the removal of the tires from the wheels when such removal is necessary.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is a plan view of an automobile chassis equipped with the combined bumper and guard of my invention.

Figure 2 is a side view of the structure shown in Figure 1.

Figure 3 is a vertical sectional view of the structure taken on the line 3—3 of Figure 1.

As illustrated in the drawings, the device 4 of my invention is shown applied to an automobile chassis including a frame 7 provided with the usual longitudinal members 8. Preferably, a complete device is arranged to be provided at each end of the automobile, and in the preferred embodiment of the invention, each device comprises a transverse bumper and guard portion 9 and longitudinal bumper and guard portions 11. The transverse portions are arranged to be positioned across the front or rear of the automobile, as the case may be, whereas, the longitudinal portions are arranged to be positioned at the sides of the automobile directly opposite the front or rear wheels thereof.

The different portions of the device are arranged to be held in spaced relation to the adjacent portions of the automobile and are preferably adapted to be supported by the longitudinal frame members 8. The adjacent extremities of the transverse and longitudinal portions of each device are preferably connected together so that they may cooperate to support each other and to define a continuous U-shaped guard which encloses the front or rear of the automobile.

In the present embodiment of the invention, the guard portions 9 and 11 comprise a plurality of horizontally disposed bars 12 and 13 respectively, which are aligned edgewise in a vertical plane. The connection of adjoining guard portions 9 and 11 respectively is preferably effected by forming the adjacent ends of the bars 12 and 13 with vertically disposed eyes 14 and 16 which engage a common pin 17, it being noted that the eyes of the different portions are alternately disposed along the pin so that the bars of each portion are held spaced in their plane.

Each device is preferably positioned to have a central horizontal plane thereof in coplaner relation with the wheels centers, and, in order to conveniently attach the portions to the automobile in this position, the transverse bars 12 are preferably secured to the extremities of the longitudinal frame members 8 by means of brackets 19. As here shown, each of the latter is formed of two parts 21 and 22 secured respectively to the upper and lower of said bars by means of clamps 23.

The longitudinal portions 11 of my device are arranged to be secured to the automobile independently of the transverse portions 9. As here shown, such attachment is provided by securing them to the extremities of a cross-rod 26 which is attached to the frame members by means of suitable brackets 27. Connection of the side bars 13 with such cross rod is effected by means of vertically disposed eyes 28 and 29 formed at the extremities of the bars and rod respectively, in which a pin 31 is arranged to engage in a manner similar to the engagement of the pin 17 in the eyes 14 and 16. It will now be noted that the pins 17 and 31 are preferably formed as bolts to provide for the ready detachment of the portions and crossrod from each other. In this manner, should it be necessary to remove or replace a wheel or tire of the automobile, it is merely necessary to remove either a bolt 17 or a bolt 31 to permit the outward swinging of the side portion about the remaining bolt to thus allow free access to such wheel or tire. The side bars are preferably clamped in fixed relation by means of suitable clamps 32, so that when the side portion is moved outwardly as described, the disengaged eyes will be maintained in proper relation.

It is to be noted that the side portions 11 of the device extend beyond horizontally opposite edges of the wheels of the automobile, thereby insuring the fullest possible protection therefor, as well for the fenders or mudguards 33 of the wheels, particularly in the side collisions hereinbefore referred to. In connection with the latter it is to be noted that owing to the limited space between the adjacent ends of the front and rear side bars, an automobile striking the side of the one on which my device is provided, will invariably strike either one or both of the devices, thereby preventing damage to any of the vital parts of the automobile.

The bars 12 and 13, comprising the different portions of the device, are, as here shown, of sinuous form in horizontal section, thereby providing the device of my invention with shock absorbing qualities far superior to those of straight bars. It will now be seen that the device thus forms a most effective guard and bumper for the automobile.

I claim:—

1. In a bumper for an automobile, a bumper bar arranged to be secured to an automobile to extend horizontally thereof and being of sinuous form in horizontal section.

2. In a bumper for an automobile, a bumper bar arranged to extend substantially horizontally of and in spaced relation to the automobile and being of sinuous form in horizontal section, and means secured to the rearward convex portions of the bar for securing the bar to the automobile.

In testimony whereof, I have hereunto set my hand at Oakland, California, this 5th day of October, 1925.

FREDERICK A. HOBERECHT.